United States Patent
Ngo et al.

(10) Patent No.: US 7,613,423 B2
(45) Date of Patent: Nov. 3, 2009

(54) METHOD OF CREATING ACTIVE MULTIPATHS FOR MIMO WIRELESS SYSTEMS

(75) Inventors: Chiu Ngo, San Francisco, CA (US); Jun Shen, Palo Alto, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 330 days.

(21) Appl. No.: 10/938,374

(22) Filed: Sep. 10, 2004

(65) Prior Publication Data

US 2006/0057958 A1   Mar. 16, 2006

(51) Int. Cl.
*H04B 7/14* (2006.01)
(52) U.S. Cl. .................. 455/18; 455/11.1; 455/24; 370/315
(58) Field of Classification Search .............. 455/7, 455/101, 18, 11.1, 15, 16, 24, 88, 500; 370/315
See application file for complete search history.

(56) References Cited

U.S. PATENT DOCUMENTS

| | | | | |
|---|---|---|---|---|
| 7,072,628 B2 * | 7/2006 | Agashe et al. | ............... | 455/140 |
| 2004/0266338 A1 * | 12/2004 | Rowitch | ............... | 455/7 |
| 2004/0266339 A1 * | 12/2004 | Larsson | ............... | 455/7 |

OTHER PUBLICATIONS

David Gesbert et al., *Technologies and Performance for Non-Line-of-Sight Broadband Wireless Access Networks*, IEEE Communications Magazine, Apr. 2002, pp. 86-95.

Lizhong Zheng et al., *Diversity and Multiplexing: A Fundamental Tradeoff in Multiple-Antenna Channel*, IEEE Transaction on Information Theory, vol. 49, No. 5, May 2003.
Gerard J. Foschini, *Layered Space-Time Architecture for Wireless Communication in a Fading Environment When Using Multi-Element Antennas*, Bell Labs Technical Journal, Autumn 1996.
IEEE P802.11n/D1.0, Draft Amendment to STANDARD [FOR] Information Technology—Telecommunications and information exchange between systems—local and Metropolitan networks—Specific requirements—Part 11: Wireless LAN Medium Access Control (MAC) and Physical Layer (PHY) specifications: Enhancements for Higher Throughput, Mar. 2006, pp. 1-335.
International Standard ISO/IEC 13818-2:2000, "Information technology—Generic coding of moving pictures and associated audio information.", Mar. 1, 2002, pp. 1-4.
IEEE Wireless LAN Edition (2003), "A compilation based on IEEE Std 802.11TM-1999 (R2003) and its amendments.". pp. 1-706.

(Continued)

*Primary Examiner*—Quochien B Vuong
(74) *Attorney, Agent, or Firm*—Kenneth L. Sherman, Esq.; Michael Zarrabian, Esq.; Myers Andras Sherman LLP (57) ABSTRACT

A method of transmission in a wireless communication system including a transmitter, a transceiver and a receiver. The transmitter transmits a first signal to the receiver. The transceiver also receives the first signal and retransmits the first signal to the receiver by modifying the signal characteristics, such that the first signal and the retransmitted signal are received substantially uncorrelated at the receiver.

51 Claims, 6 Drawing Sheets

OTHER PUBLICATIONS

Stephens et al., "Joint Proposal: High throughput extension to the 802.11 Standard: MAC," doc.: 802.11-05/1095r2, Nov. 16, 2005, pp. 1-37.

IEEE P802.11e/D13.0, "Amendment: Medium Access Control (MAC) Quality of Service (QoS) Enhancements," Jan. 2005, pp. 1-198.

* cited by examiner

FIG. 1

Prior Art

FIG. 2

FIG. 3A $$\begin{bmatrix} y_1 \\ y_2 \\ y_3 \end{bmatrix} = \begin{bmatrix} h_{11'} & h_{12'} & h_{13'} \\ h_{21'} & h_{22'} & h_{23'} \\ h_{31'} & h_{32'} & h_{33'} \end{bmatrix} \cdot \begin{bmatrix} x_1 \\ x_2 \\ x_3 \end{bmatrix}$$

$$\begin{bmatrix} y_1 \\ y_2 \\ y_3 \end{bmatrix} = \begin{bmatrix} h_{11'} & 0 & 0 \\ 0 & h_{22'} & 0 \\ 0 & 0 & h_{33'} \end{bmatrix} \cdot \begin{bmatrix} x_1 \\ x_2 \\ x_3 \end{bmatrix}$$

METHOD OF CREATING ACTIVE MULTIPATHS FOR MIMO WIRELESS SYSTEMS

FIELD OF THE INVENTION

The present invention relates generally to data communication, and more specifically to data communication in multiple data streams/paths to be transmitted via multiple transmission channels of a multi-channel communication system such as a multiple-input multiple-output (MIMO) system.

BACKGROUND OF THE INVENTION

Figure 1:
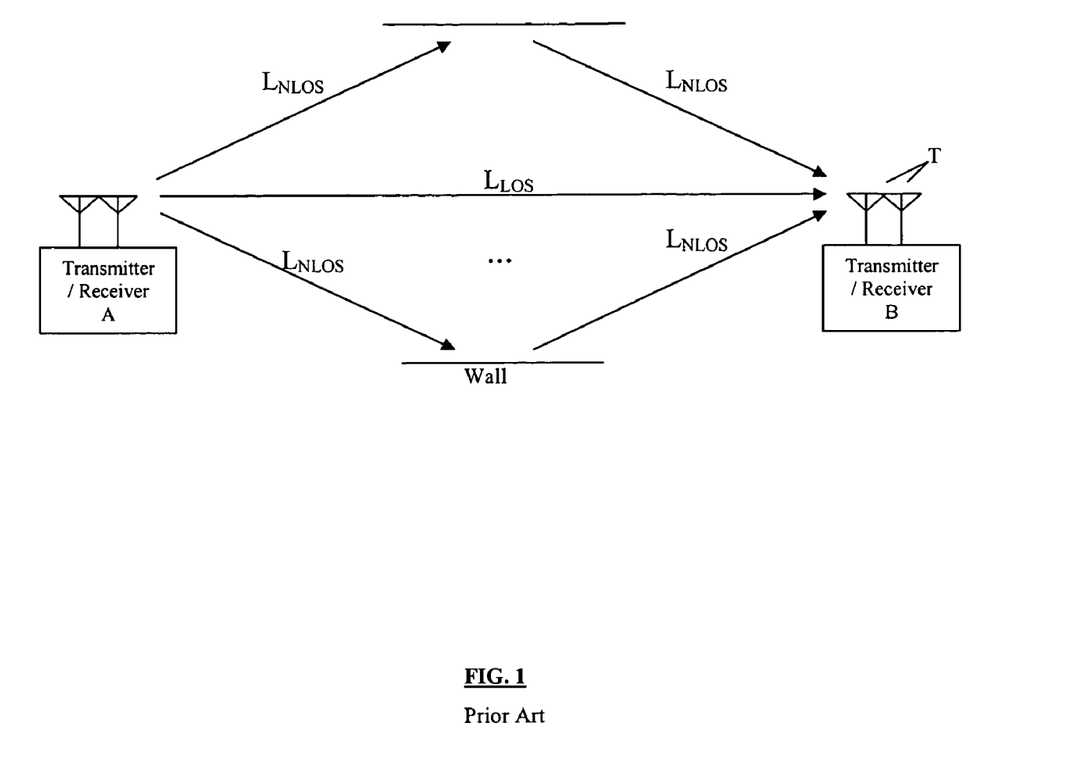
FIG. 1 shows an example block diagram of a prior art MIMO system.

In wireless communication systems that use radio frequency (RF) transmissions, an RF signal from a transmitter A may reach a receiver B via a number of propagation paths (multipath) such as shown in FIG. 1. To provide diversity against harmful path effects and improve performance, multiple transmit and receive antennas T are used. Propagation paths between the transmit and receive antennas are independent when a transmission on one path is not formed as a linear combination of the transmissions on the other paths.

A multiple-input-multiple-output (MIMO) communication system employs multiple transmit antennas and multiple receive antennas for data transmission. A MIMO channel formed by the transmit and receive antennas may be decomposed into independent channels, wherein each channel is a spatial subchannel (or a transmission channel) of the MIMO channel and corresponds to a dimension. The MIMO system can provide improved performance (e.g., increased transmission capacity) if the additional dimensionalities created by the multiple transmit and receive antennas are utilized.

In spatial multiplexing, there are different data streams/paths in the same channel wherein a different transmission antenna is used for each data stream. In MIMO systems, in order to realize advantages of spatial multiplexing for high spectral efficiency, the wireless channels need to be multipath-rich and less correlated.

To increase system link robustness and spectral efficiency in MIMO systems, one conventional approach uses a transmitter that employs a spatial multiplexing scheme to send signals to the receiver. However, this method is not effective if the channel is not multipath-rich. In another conventional approach, the transmitter antenna is not beamed directly at the receiver antenna. However, this method cannot guarantee to provide a multipath-rich channel. Yet in another conventional approach, passive reflectors are placed at the receiver antenna to collect more multipath signals. Again, this method cannot guarantee to provide a multipath-rich channel.

Therefore, conventional multi-path rich environments are passive wherein signals from a transmitter A travel to a receiver B by line-of-sight (LOS) and by non-line-of-sight (NLOS) which is by reflection from objects such as walls (FIG. 1). As such, there is no guarantee for multipath-rich channels and thus, the MIMO system's spectral efficiency drops (given a channel bandwidth and a fixed time period, the more bits transmitted, the higher the spectral efficiency).

There is, therefore, a need for a method and system that provide active multipaths to facilitate spatial multiplexing gain from MIMO systems.

BRIEF SUMMARY OF THE INVENTION

The present invention addresses the above needs. In one embodiment the present invention provides a method of transmission in a wireless communication system including a transmitter, a transceiver and a receiver, including the steps of transmitting a first signal from the transmitter to the receiver; and receiving the first signal at the transceiver and retransmitting the first signal to the receiver by modifying the signal characteristics, such that the first signal and the retransmitted signal are received substantially uncorrelated at the receiver.

The step of modifying the signal characteristics can include selectively introducing a time delay in retransmission of the first signal from the transceiver such that the retransmitted signal is received by the receiver after the first signal, whereby the first signal and the retransmitted signal are received substantially uncorrelated at the receiver. Further, the step of modifying the signal characteristics can include the steps of selectively changing the magnitude of the first signal before retransmission, such that the first signal and the retransmitted signal are received substantially uncorrelated at the receiver.

The step of modifying the signal characteristics further includes the steps of determining a modification such that first signal and the retransmitted signal are received substantially uncorrelated at the receiver. Such steps include receiving feedback from the receiver at the transceiver indicating relative correlation of the first signal and the retransmitted signal received at the transceiver, and if the first signal and the retransmitted signal are indicated as not sufficiently uncorrelated, modifying and retransmitting the first signal from the transceiver such that the first signal and the second retransmission signal are received substantially uncorrelated at the receiver.

In another version, modifying the signal characteristics includes the steps of randomly modifying the signal characteristics, whereby the first signal and the retransmitted signal are received as essentially statistically independent signals at the receiver. Modifying the signal characteristics can include the steps of randomly changing the magnitude of the first signal before retransmission, such that the first signal and the retransmitted signal are received as essentially statistically independent signals at the receiver. Further, modifying the signal characteristics can include the steps of randomly introducing a time delay in retransmission of the first signal from the transceiver such that the retransmitted signal is received by the receiver after the first signal, whereby the first signal and the retransmitted signal are received as essentially statistically independent signals at the receiver.

The wireless communication system can comprise a multiple-input multiple-output (MIMO) system, such that the transmissions from the transmitter and the transceiver form multipaths. As such, the first signal and the retransmitted signal are transmitted over a plurality of transmit antennas in the MIMO communication system, and the receiver demuliplexes the signals. The wireless communication system can further include multiple transceivers, such that each transceiver performs the above steps.

These and other features, aspects and advantages of the present invention will become understood with reference to the following description, appended claims and accompanying figures.

DETAILED DESCRIPTION OF THE INVENTION

In one embodiment, the present invention provides a system and method for creating active multipaths to facilitate spatial multiplexing gain from MIMO systems. One of the many potential applications of this invention is MIMO high-speed wireless home networking systems including networked consumer electronics and computers. Other applications are also possible and include net-meeting/video conferencing in enterprise networks, etc.

Figure 2:
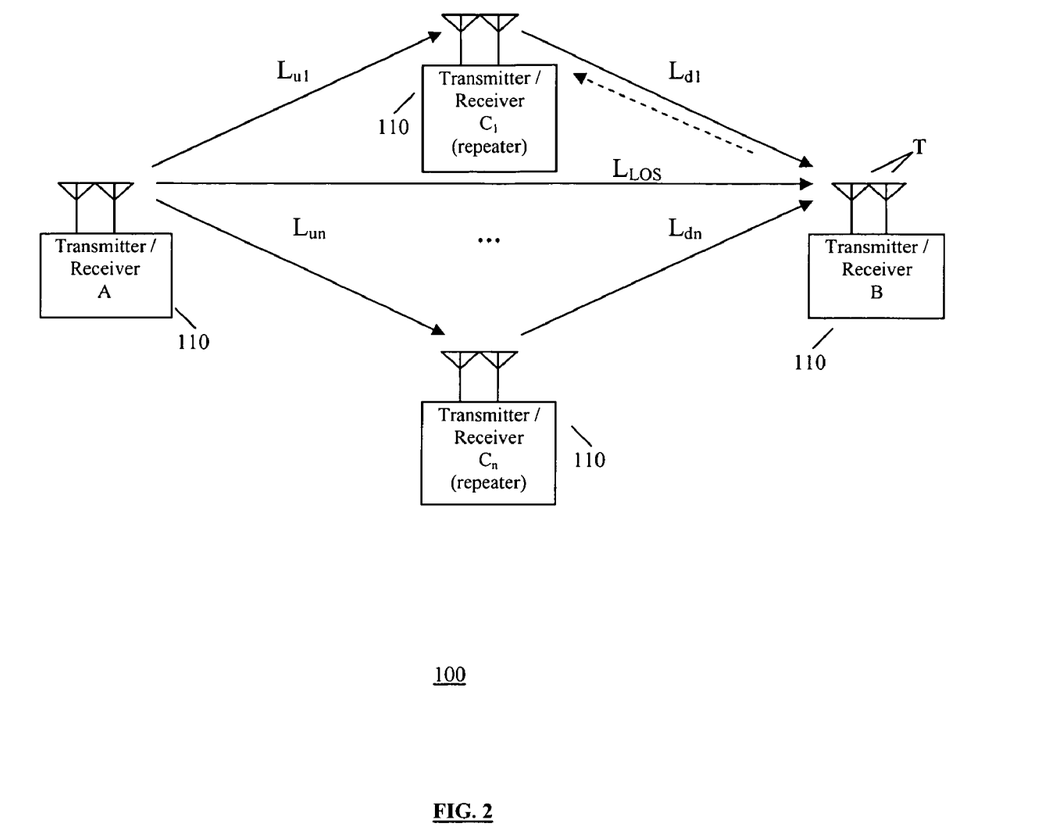
FIG. 2 shows a block diagram of an example architecture of an embodiment of a wireless communication system according to the present invention.

Referring to FIG. 2, an embodiment of an active multipath MIMO system 100 according to the present invention comprises multiple communication devices 110 (e.g., transmitters/receivers) that include a network protocol wherein a number of the devices in the network 100 have the capability to receive signals from specific devices and retransmit the signal to other specific devices. The retransmission can be in various retransmission modes such as, e.g., randomly (i.e., Random Mode) or based on network management (i.e., Controlled Mode). As those skilled in the art recognize, other retransmission modes are also possible and contemplated by the present invention.

The MIMO system 100 in FIG. 2 is a wireless network, wherein the devices 110 include communication devices A, B, $C_1, \ldots, C_n$, where in one example the device A comprises a transmitter, the device B comprises a receiver and the devices $C_1, \ldots, C_n$ comprise transceivers. A signal is transmitted from the transmitter A to the receiver B through a line-of-slight path $L_{LOS}$. If the environment is not multipath-rich, then the advantage of spatial multiplexing will not be obtained at the receiver B. In such environment, the n idle devices $C_1, \ldots, C_n$ are used as repeaters to provide active multipaths. In one example, each device 110 in the network can function as a repeater when it hears a transmission. In another example, only a number of devices 110 in the network function as repeaters.

As such, for transmission from the transmitter A to the receiver B, the devices $C_1 \ldots C_n$ function as repeaters that retransmit signals from the transmitter A to the receiver B. Each of the repeaters $C_1 \ldots C_n$ retransmits signals by effecting different characteristics (e.g., with different delay, signal gain/strength, etc.) in the retransmitted signal than those retransmitted by other repeaters. Retransmission of signals having different characteristics results in signals that arrive at the receiver B with less correlation.

Accordingly, the repeaters $C_1 \ldots C_n$ provide active multipath-rich and statistically independent channels between the transmitter A and the receiver B for MIMO transmission with increased spatial multiplexing gain. Because retransmitted signals from the repeaters through different paths have phase (delay) or magnitude that change independently of one another, less correlated signals are received by the receiver B. For example, magnitudes of the retransmitted signals received from different paths (i.e., repeaters) change at different times, independent of one another. Or, the retransmitted signals arrive at the receiver B at essentially different times.

In one example implementation according to the present invention, the actively created multipaths can be realized in two modes: Controlled Mode and Random Mode. In the Controlled Mode, the retransmission of signals at a repeater is under control of a media access control protocol. The media access control protocol is a component of industry standard IEEE 802.11 protocol. Typically, MAC protocol of a station discards any packet that is not intended to this station. For this invention, the MAC is modified to reroute the packet back to PHY layer during the "controlled mode" operation. For example, after receiving a signal from transmitter A via a path $L_{u1}$, the repeater $C_1$ retransmits the received signal to the intended receiver B via a LOS path $L_{d1}$ from the repeater $C_1$ to receiver B. With n repeaters $C_1 \ldots C_n$, n controlled retransmission signals of the original signal transmitted by the transmitter A are generated by the repeaters $C_1 \ldots C_n$, wherein the retransmitted signals are less correlated.

In this example, the gain and delay characteristics of the retransmitted signals are selected by the repeaters $C_1 \ldots C_n$ based on signal quality feedback from the receiver B. If the signal from the repeaters $C_1 \ldots C_n$ arrive at the receiver B with undesirable correlation, then one or more of the repeaters $C_1 \ldots C_n$ changes the gain and/or delay of its retransmission signal such that the retransmitted signals arrive at the receiver B with less correlation relative to other retransmitted signals. As such, the receiver B experiences n active multipaths $(L_{d1} \ldots L_{dn})$ and one LOS path $(L_{LOS})$. The active multipaths are so controlled that they are uncorrelated among themselves and their LOS counterpart. The strong and statistically independent coordinated signals received at the receiver B provide controlled spatial multiplexing gain. In Controlled Mode, the PHY of a repeater will decode the packet and pass it to its MAC. Understanding that the packet is not intended for it and the station is currently acting as a repeater, the MAC will re-route the packet back to PHY at which a certain value of gain and delay are introduced before transmitted back through the air.

In the Random Mode, the n repeaters $C_1 \ldots C_n$ are randomly assigned the channel characteristics/profile (e.g., gain, delay, etc.) when they retransmit the signal received from transmitter A. As such, statistically independent retransmission signals are received by the receiver B wherein spatial multiplexing gain is increased. By contrast, in the Controlled Mode, feedback from the receiver B to repeaters $C_1 \ldots C_n$, indicates quality of the signal received by the receiver B, and one or more of the repeaters $C_1 \ldots C_n$ change the signal retransmission characteristics (e.g., delay, gain/magnitude, etc.) to achieve less correlation between the retransmitted signals received by the receiver B. In the Random Mode, the PHY of a repeater will resend the received signal back through the air without doing any decoding. In other words, it acts like a reflector.

In either Controlled Mode or Random Mode, once each of the repeaters $C_1 \ldots C_n$ receives a signal from the transmitter A, the repeater can introduce a delay in re-transmitting the signal, amplify the signal before retransmission as needed, etc. The delay in re-transmission introduces lack of correlation between the signals received at the receiver B because the retransmitted signals are received by the receiver B at different times. Similarly, amplification introduces lack of correlation between the signals received by the receiver B because the retransmitted signals have different magnitudes of power. Other ways of uncorrelating the signals are possible, and include, e.g., rotations of the signals to generate statistically independent coordinated signals.

As a routine procedure in MIMO systems, the receiver B is trained based on channel profiles of the repeaters $C_1 \ldots C_n$, such that the receiver B knows which of the repeaters $C_1 \ldots C_n$ sent which signal. As such, when the receiver B receives a signal from repeater $C_1$, based on pre-knowledge of profile of the repeater $C_1$, the receiver B knows the signal came from repeater $C_1$ (e.g., a first antenna). And, when the receiver B receives a signal from the repeater $C_2$, based on pre-knowledge of the profile of the repeater $C_2$, the receiver B knows that the signal came from repeater $C_2$ (e.g., a second antenna). And, so on. The receiver B decodes the signals and distinguish between various repeaters $C_1 \ldots C_n$ (this is how multiplexing is performed at the receiver B). The repeaters $C_1 \ldots C_n$ retransmit the signals from transmitter A to receiver B such that the receiver B can better distinguish between all of the signals it receives from the transmitter A and the repeaters $C_1 \ldots C_n$.

Figure 3A:
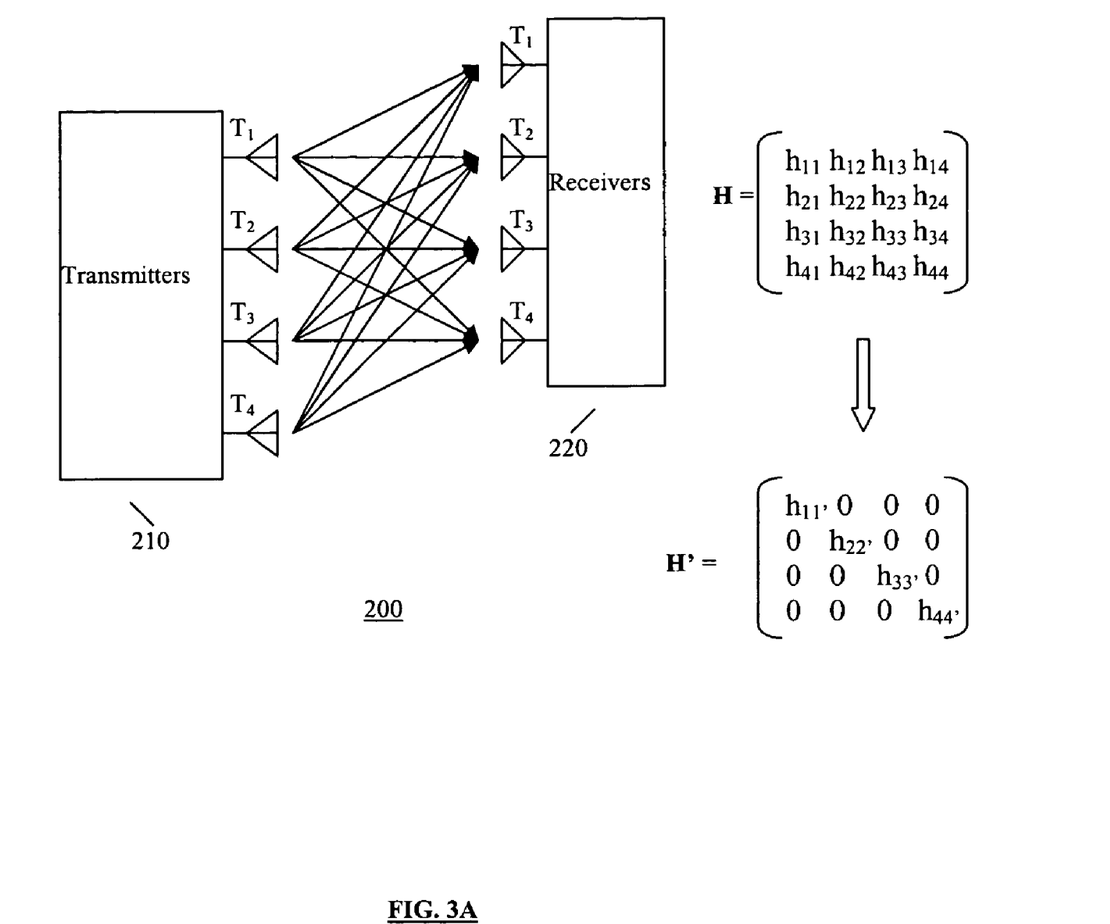
FIG. 3A shows an example MIMO channel model.
Figure 3B:
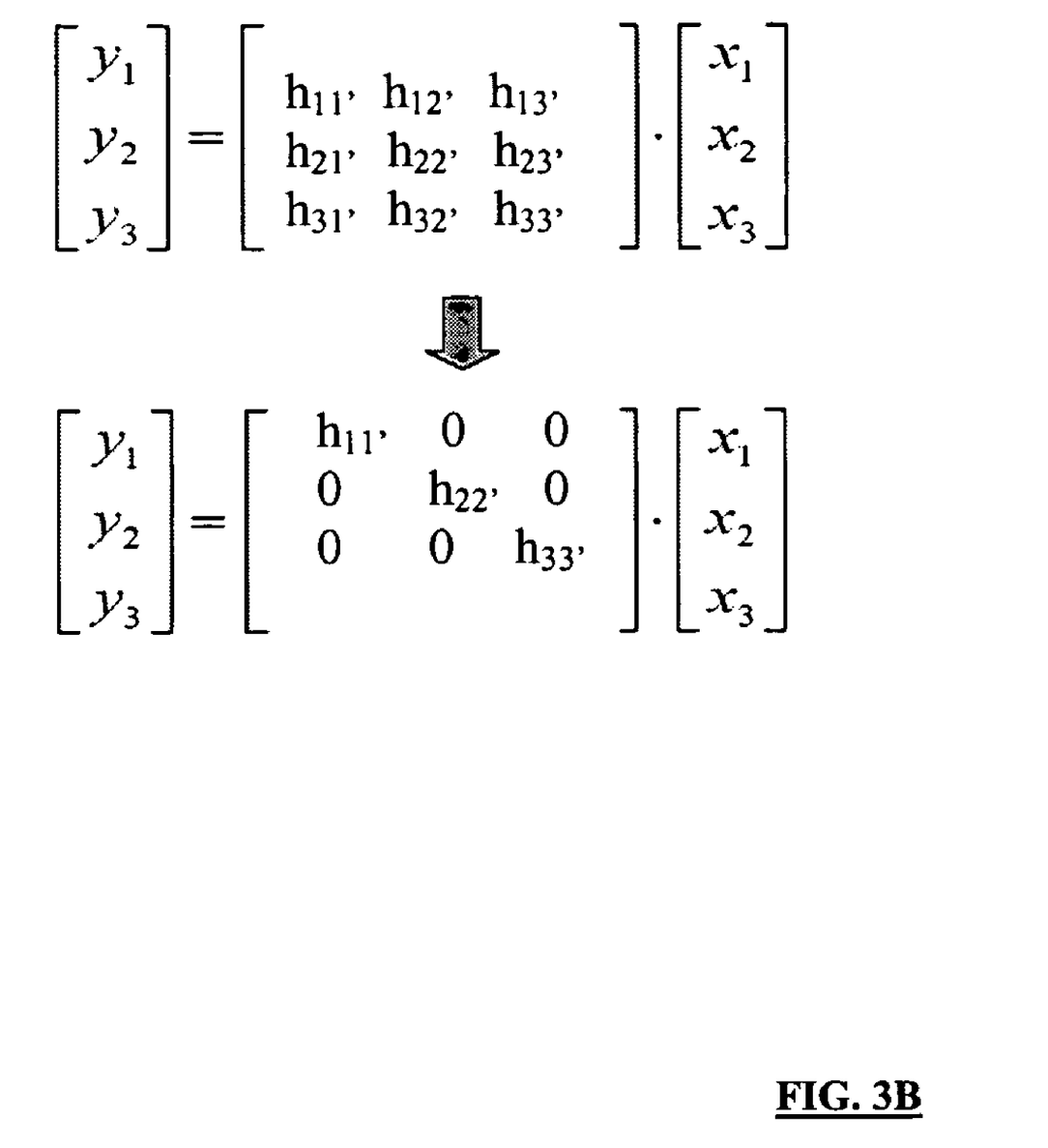
FIG. 3B shows an example matrix diagonalization for the channel model of FIG. 3A.

When the MIMO system 100 is trained, the receiver B receives a channel H profiles of the repeaters $C_1 \ldots C_n$ and the transmitter A and implements a channel matrix (FIGS. 3A-B, described further below). Based on the channel matrix, the receiver B can determine if the received signals are correlated or not. In the Random Mode, the repeaters randomly change the channel profile for retransmission of signals to the receiver B. In the Controlled Mode, the receiver B provides feedback to the repeaters $C_1 \ldots C_n$ indicating that the received signals are correlated, whereby the repeaters change the channel profile (e.g., change delay, change signal magnitude) to decrease correlation. The receiver B and the repeaters $C_1 \ldots C_n$ communicate amongst themselves (using feedback) and decide how to change the channel profile to make the retransmitted signals less correlated. The receiver B sends each of the repeaters $C_1 \ldots C_n$ a confirmation indicating if the received signal is acceptable or otherwise, so that the repeater can change the channel profile (e.g., delay, gain, etc.) and retransmit the signal to the receiver B until the receiver B confirms that the received signal is acceptable. The coordination is between the receiver B and each of the repeaters $C_1 \ldots C_n$, wherein the repeaters $C_1 \ldots C_n$ are unaware of one another. The length of delay and amount of gain are determined by the feedback information from the receiver about the correlation of the channel.

Referring to FIG. 3A, in an example MIMO system 200, including transmitters 210 (e.g., transmitter A and repeaters $C_1 \ldots C_n$ FIG. 2) and receivers 220 (e.g., receiver B in FIG. 2) each having 4 antennas ($T_1 \ldots T_4$), the channel model is represented by the matrix H at a receiver 220. If a strong/compatible signal is received, the matrix is resolved, and the channel matrix is transformed into a diagonal matrix H' by diagonalization/inversion, representing a virtual multi-channel such that the gain is increased. If a 4×4 matrix is used as in FIG. 3A, there are 4 virtual channels. FIG. 3B shows an example diagonalization for a 3×3 matrix channel model. When channel inversion is performed, based on channel characteristics and decoding of the received signals, if the multiple channels are relatively independent, then there are multiple independent paths for the received signals, increasing throughput. In the 4×4 case, the maximum throughput can be as high as four times that of a single antenna system.

Figure 4:
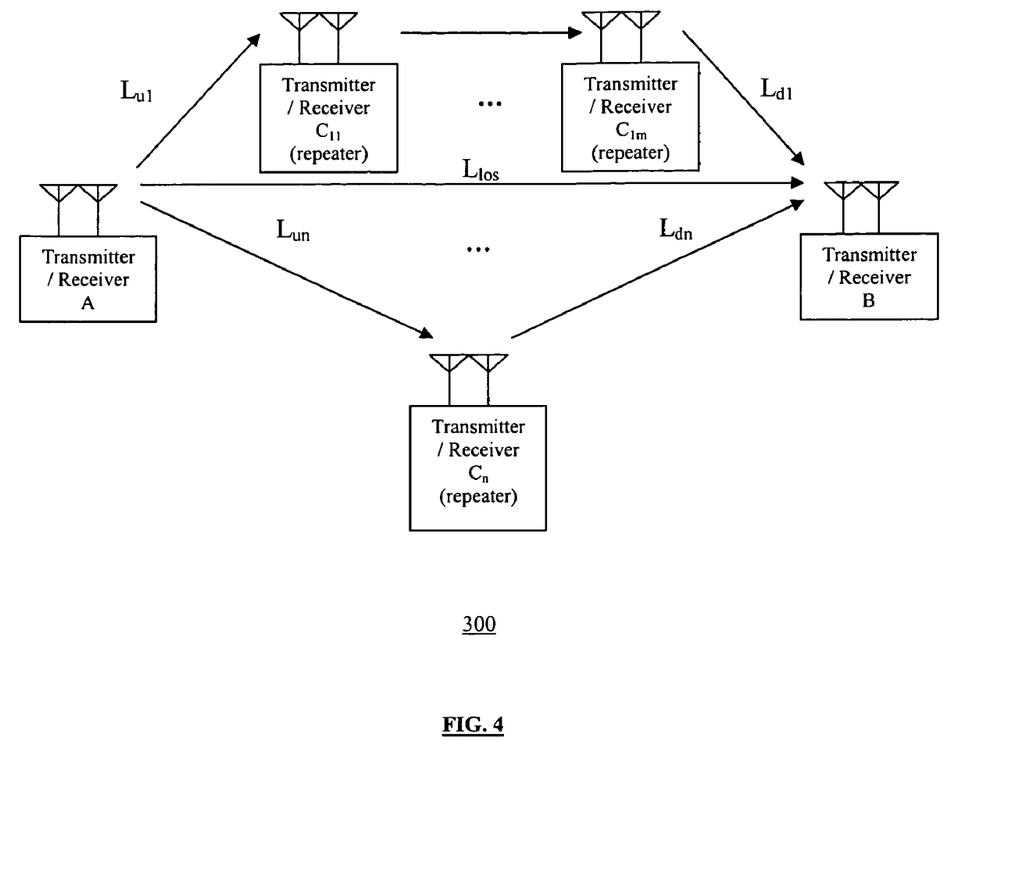
FIG. 4 shows a block diagram of an example architecture of another embodiment of a wireless communication system according to the present invention.

Referring back to FIG. 2, the repeaters $C_1 \ldots C_n$ can receive signals from transmitter A by LOS or another way (e.g., reflection off the walls, through other repeaters, etc.). A transmission from the transmitter A to the transmitter B by LOS is one path, and a transmission from the transmitter A to transmitter B via each repeater is another path. Further, as shown by example MIMO system 300 in FIG. 4, each path from the transmitter A to the receiver B can include two or more repeaters $C_{11} \ldots C_{1m}$.

Figure 5:
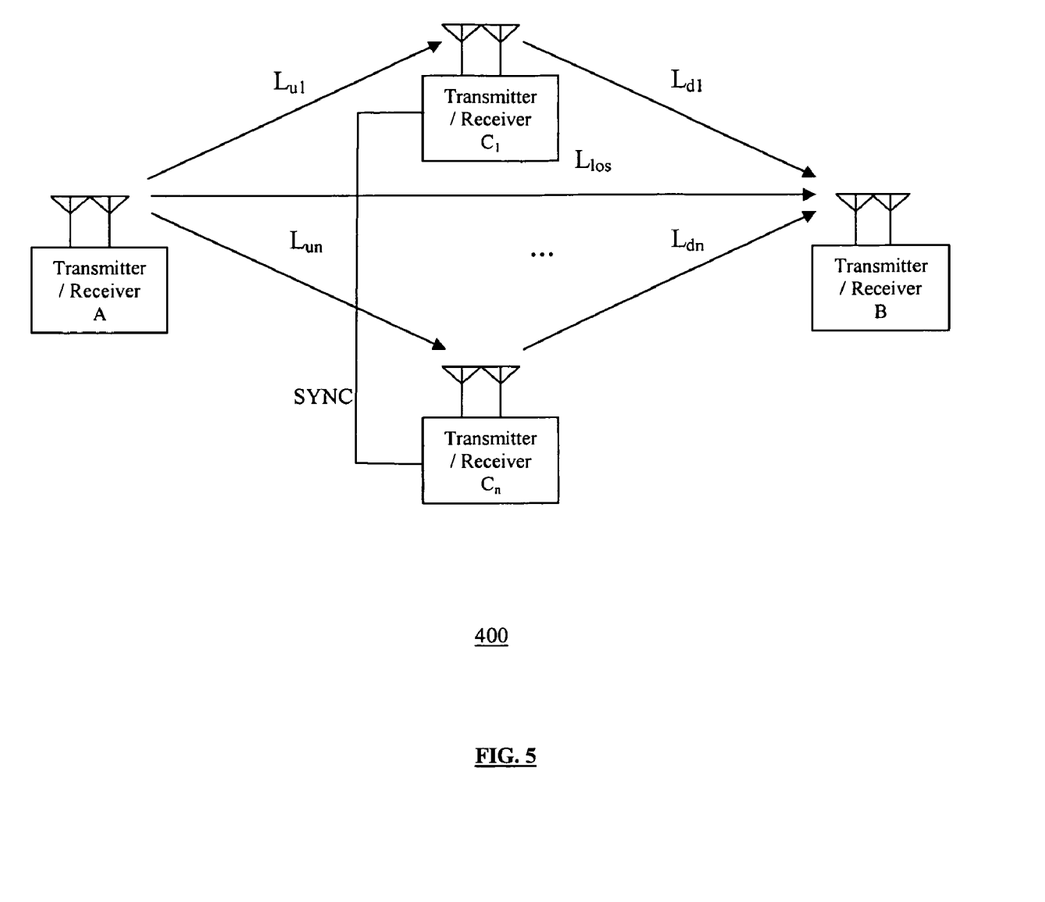
FIG. 5 shows a block diagram of an example architecture of yet another embodiment of a wireless communication system according to the present invention.

In another embodiment, as shown by the example system 400 in FIG. 5, at least a number of the repeaters $C_1 \ldots C_n$ can communicate therebetween and synchronize their channel profile modifications using global information, to provide even less correlation between the signals. Synchronization between repeaters is based on the feedback information from the receiver B about the channel. The receiver B can predefine the gain and delay of each repeater.

Yet in another example, one or more of the repeaters $C_1 \ldots C_n$ (FIG. 2) operate in Random Mode and one or more other repeaters operate in Controlled Mode. Further, two or more the repeaters that operate in the Controlled Mode can synchronize their channel profile modifications as discussed.

To convert a communication device in the network to a repeater, the MAC protocol and physical layers are changed so that when a repeater receives a signal intended for a receiver, the repeater retransmits the signal for the intended receiver. Since the MAC protocol is a Carrier Sense Multiple Access with Collision Avoidance (CSMA/CA) based one (i.e., listen before talk), if the packet is not intended for that station, it will act as a repeater for another station.

As those skilled in the art recognize, other methods of assigning channel characteristics are also possible and contemplated by the present invention.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of transmission in a wireless communication system, the method comprising:

transmitting a first signal from a first signal source to a receiver via a first signal path; and modifying characteristics of the first signal and retransmitting the modified first signal from a second signal source via a second signal path, such that the first signal and the modified first signal are received substantially uncorrelated at the receiver, via the first and second signal paths, respectively, wherein the characteristics are modified based on correlation quality feedback from the receiver in a first mode and randomly assigned in a second mode.

2. The method of claim 1, wherein the second signal source comprises a transceiver, and wherein modifying the signal characteristics includes selectively introducing a time delay in retransmission of the modified first signal from the transceiver such that the retransmitted modified first signal via the second signal path is received by the receiver after the first signal via the first signal path, whereby the first signal via the first signal path and the retransmitted modified first signal via the second signal path are received substantially uncorrelated at the receiver.

3. The method of claim 1, wherein modifying the signal characteristics includes selectively changing a magnitude of the first signal before retransmission, such that the first signal via the first signal path and the retransmitted modified first signal via the second signal path are received substantially uncorrelated at the receiver.

4. The method of claim 1, wherein the first signal source comprises a transmitter and the second signal source comprises a transceiver, and wherein the wireless communication system comprises a multiple-input multiple-output (MIMO) system, such that the transmissions from the transmitter and the transceiver form multipaths.

5. The method of claim 1, wherein:
the wireless communication system comprises a multiple-input multiple-output (MIMO) communication system.

6. The method of claim 1, wherein modifying the signal characteristics further includes determining a modification such that first signal via the first signal path and the retransmitted modified first signal via the second signal path are received substantially uncorrelated at the receiver.

7. The method of claim 6, further comprising determining at the receiver a relative correlation between the first signal via the first signal path and the modified first signal from the second signal path, wherein the second signal source comprises a transceiver, and wherein determining the modification further includes receiving a feedback from the receiver at the transceiver indicating the relative correlation, and if the first signal and the retransmitted modified first signal are indicated as not sufficiently uncorrelated, further modifying and retransmitting the further modified first signal from the transceiver such that the first signal and the further modified first signal are received substantially uncorrelated at the receiver.

8. The method of claim 6, wherein modifying the signal characteristics includes randomly changing a magnitude of the first signal before retransmission, such that the first signal and the retransmitted modified first signal are received as essentially statistically independent signals at the receiver.

9. The method of claim 6, wherein modifying the signal characteristics includes randomly modifying the signal characteristics, whereby the first signal and the retransmitted modified first signal are received as essentially statistically independent signals at the receiver.

10. The method of claim 6, wherein the second signal source comprises a transceiver, and wherein modifying the signal characteristics includes randomly introducing a time delay in retransmission of the modified first signal from the transceiver such that the retransmitted modified first signal via the second signal source is received by the receiver after the first signal via the first signal source, whereby the first signal and the retransmitted modified first signal are received as essentially statistically independent signals at the receiver.

11. The method of claim 6, wherein the communication system includes multiple transceivers, the method further comprising:
receiving the first signal at the multiple transceivers and from each transceiver retransmitting modified first signal with modified signal characteristics, such that the first signal and the retransmitted modified first signals are received substantially uncorrelated at the receiver.

12. The method of claim 11, wherein modifying the signal characteristics in each transceiver includes introducing a time delay in retransmission of the modified first signal from that transceiver such that the retransmitted modified first signals are received by the receiver after the first signal, whereby the first signal and the retransmitted modified first signals are received substantially uncorrelated at the receiver.

13. The method of claim 11, wherein modifying the signal characteristics in each transceiver includes changing a magnitude of the first signal before retransmission, such that the first signal and the retransmitted modified first signal are received substantially uncorrelated at the receiver.

14. The method of claim 11, wherein the first signal source comprises a transmitter, and wherein the wireless communication system comprises a multiple-input multiple-output (MIMO) system, such that the transmissions from the transmitter and the transceivers form multipaths.

15. The method of claim 11, wherein modifying the signal characteristics in each transceiver further includes determining a modification such that the first signal and the retransmitted modified first signals are received substantially uncorrelated at the receiver.

16. The method of claim 15, further comprising determining at the receiver a relative correlation among the received signals, wherein determining the modification in each transceiver further includes receiving feedback from the receiver at that transceiver indicating the relative correlation, and if the first signal and the retransmitted modified first signal are indicated as not sufficiently uncorrelated, farther modifying and retransmitting the further modified first signal from that transceiver such that the first signal and the second retransmission signal are received substantially uncorrelated at the receiver.

17. The method of claim 15, wherein modifying the signal characteristics in each transceiver includes randomly changing a magnitude of the first signal before retransmission, such that the first signal and the retransmitted signals are received as essentially statistically independent signals at the receiver.

18. The method of claim 15, wherein modifying the signal characteristics in each transceiver includes randomly introducing a time delay in retransmission of the modified first signal from the transceiver such that the retransmitted modified first signal is received by the receiver after the first signal, whereby the first signal and the retransmitted modified first signal are received as essentially statistically independent signals at the receiver.

19. The method of claim 11, further including coordinating modification of the signal characteristics of the first signal in the transceivers, such that the first signal and the retransmitted signals are received substantially uncorrelated at the receiver.

20. The method of claim 1, wherein:
the wireless communication system comprises a multiple-input multiple-output (MIMO) communication system; and
the first signal and the retransmitted modified signals comprise a plurality of data streams, such that the plurality of data streams are transmitted over a plurality of transmit antennas in the MIMO communication system.

21. The method of claim 1, wherein the first signal source comprises a transmitter, the second signal source comprises a transceiver, the method further comprising:
determining at the receiver a correlation between the first signal via the first signal path and the modified first signal via the second signal path.

22. The method of claim 21, wherein the first signal path does not include the transceiver.

23. The method of claim 22, wherein the first signal path is a direct line of sight (LOS) path.

24. The method of claim 1, wherein the characteristics include signal delay modifications and signal gain modifications.

25. The method of claim 1, wherein the first mode is a controlled mode, and the second mode is a random mode.

26. The method of claim 25, wherein in the controlled mode, only one signal is delayed, and in the random mode only one random repeated signal is used.

27. A wireless communication system, comprising:
a first signal source, a second signal source, and a receiver,
wherein the transmitter is configured to transmit a first signal from the first signal source to the receiver via a first signal path, and
wherein the second signal source is configured to receive the first signal, modify characteristics of the first signal, and retransmit the modified first signal to the receiver via a second signal path, such that the first signal and the retransmitted modified first signal are received substantially uncorrelated at the receiver, wherein the characteristics are modified based on correlation quality feedback from the receiver in a first mode and randomly assigned in a second mode.

28. The system of claim 27, wherein the second signal source comprises a transceiver, and wherein the transceiver modifies the first signal received at the transceiver by introducing a time delay in retransmission of the modified first signal from the transceiver such that the retransmitted modified first signal is received via the second signal path by the receiver after the first signal via the first signal path, whereby the first signal and the retransmitted modified first signal are received substantially uncorrelated at the receiver.

29. The system of claim 27, wherein the transceiver modifies by selectively changing a magnitude of the first signal before retransmission, such that the first signal and the retransmitted modified first signal are received substantially uncorrelated at the receiver. signal and the retransmitted signals are received substantially uncorrelated at the receiver.

30. The system of claim 27, wherein the first signal source comprises a transmitter, the second signal source comprises a transceiver, and wherein the wireless-communication system comprises a multiple-input multiple-output (MIMO) system, such that the transmissions from the transmitter and the transceiver form multipaths.

31. The system of claim 27, wherein:
the wireless communication system comprises a multiple-input multiple-output (MIMO) communication system.

32. The system of claim 27, wherein the second signal source comprises a transceiver, and wherein the transceiver modifies the signal characteristics by determining a modification such that first signal via the first signal path and the retransmitted modified first signal via the second signal path are received substantially uncorrelated at the receiver.

33. The system of claim 32, wherein:
the receiver transmits a feedback to the transceiver indicating a relative correlation of the first signal and the retransmitted modified first signal received at the receiver via the first and second signal paths, respectively; and the transceiver determines the modification based on the feedback from the receiver, wherein if the first signal and the retransmitted modified first signal are indicated as not sufficiently uncorrelated, the transceiver farther modifies and retransmits the further modified first signal from the transceiver such that the first signal and the further modified first signal are received substantially uncorrelated at the receiver, and wherein the relative correlation is determined at the receiver.

34. The system of claim 32, wherein the transceiver modifies the signal characteristics by randomly changing a magnitude of the first signal before retransmission of the modified first signal, such that the first signal and the retransmitted modified first signal are received as essentially statistically independent signals at the receiver.

35. The system of claim 32, wherein transceiver modifies the signal characteristics by randomly modifying the signal characteristics, whereby the first signal and the retransmitted modified first signal are received as essentially statistically independent signals at the receiver.

36. The system of claim 32, wherein the transceiver modifies the signal characteristics by randomly introducing a time delay in retransmission of the modified first signal from the transceiver such that the retransmitted modified first signal is received by the receiver via the second signal path after the first signal via the first signal path, whereby the first signal and the retransmitted modified first signal are received as essentially statistically independent signals at the receiver.

37. The system of claim 32, further comprising multiple transceivers, wherein each transceiver receives the first signal and retransmits the modified first signal to the receiver by modifying the signal characteristics, such that the first signal and the retransmitted modified first signals are received substantially uncorrelated at the receiver.

38. The system of claim 37, wherein each transceiver modifies the signal characteristics by selectively introducing a time delay in retransmission of the modified first signal from that transceiver such that the retransmitted signals are received by the receiver after the first signal, whereby the first signal and the retransmitted signals are received substantially uncorrelated at the receiver.

39. The system of claim 37, wherein each transceiver modifies the signal characteristics by selectively changing a magnitude of the first signal before retransmission, such that the first signal and the retransmitted modified first signal are received substantially uncorrelated at the receiver.

40. The system of claim 37, wherein the wireless communication system comprises a multiple-input multiple-output (MIMO) system, such that the transmissions from the transmitter and the transceivers form multipaths.

41. The system of claim 37, wherein:
the wireless communication system comprises a multiple-input multiple-output (MIMO) communication system; and the first signal and retransmitted modified signals comprise a plurality of data streams, such that the plurality of data streams are transmitted over a plurality of transmit antennas in the MIMO communication system.

42. The system of claim 37, wherein each transceiver modifies the signal characteristics by determining a modification such that first signal and the retransmitted modified signals are received substantially uncorrelated at the receiver.

43. The system of claim 42, wherein:
the receiver transmits feedback to the transceivers indicating a relative correlation of the first signal and the retransmitted modified signals received at the receiver; and each transceiver determines the modification based on the feedback from the receiver, wherein if the signals received at the receiver are indicated as not sufficiently uncorrelated, that transceiver further modifies and retransmits the further modified first signal from the transceiver such that the first signal and the further modified signals are received substantially uncorrelated at the receiver, and wherein the relative correlation is determined at the receiver.

44. The system of claim 42, wherein each transceiver modifies the signal characteristics by randomly changing a magnitude of the first signal before retransmission, such that the first signal and the retransmitted modified signals are received as essentially statistically independent signals at the receiver.

45. The system of claim 42, wherein each transceiver modifies the signal characteristics by randomly introducing a time delay in retransmission of the modified first signal from the transceiver such that the retransmitted modified first signal is received by the receiver after the first signal, whereby the first signal and the retransmitted modified first signal are received as essentially statistically independent signals at the receiver.

46. The system of claim 37, wherein the transceivers coordinate modification of the signal characteristics of the first signal in the transceivers, such that the first signal and the retransmitted modified signals are received substantially uncorrelated at the receiver.

47. The system of claim 27, further comprising multiple transceivers, wherein each transceiver modifies the signal characteristics differently such that the retransmitted modified signals are substantially uncorrelated at the receiver.

48. The system of claim 47, wherein the signal characteristics include at least one of a delay, a signal gain, and a signal strength.

49. The system of claim 27, wherein the first signal source comprises a transmitter, the second signal source comprises a transceiver, and wherein the receiver is further configured to determine a correlation between the first signal via the first signal path and the modified first signal via the second signal path.

50. The system of claim 49, wherein the first signal path does not include the transceiver.

51. The system of claim 50, wherein the first signal path is a direct line of sight (LOS) path.

\* \* \* \* \*